(12) United States Patent
Chatterji et al.

(10) Patent No.: US 9,550,933 B2
(45) Date of Patent: Jan. 24, 2017

(54) NAPTHOL-BASED EPOXY RESIN ADDITIVES FOR USE IN WELL CEMENTING

(71) Applicant: Halliburton Energy Services, Inc., Houston, TX (US)

(72) Inventors: Jiten Chatterji, Duncan, OK (US); Gregory Robert Hundt, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/401,022

(22) PCT Filed: Aug. 15, 2014

(86) PCT No.: PCT/US2014/051248
§ 371 (c)(1),
(2) Date: Nov. 13, 2014

(87) PCT Pub. No.: WO2016/024990
PCT Pub. Date: Feb. 18, 2016

(65) Prior Publication Data
US 2016/0046853 A1    Feb. 18, 2016

(51) Int. Cl.
*C09K 8/42*     (2006.01)
*E21B 33/138*   (2006.01)
*C04B 28/02*    (2006.01)
*C09K 8/44*     (2006.01)
*C09K 8/467*    (2006.01)

(52) U.S. Cl.
CPC .............. *C09K 8/426* (2013.01); *C04B 28/02* (2013.01); *C09K 8/428* (2013.01); *C09K 8/44* (2013.01); *C09K 8/467* (2013.01); *E21B 33/138* (2013.01)

(58) Field of Classification Search
None
See application file for complete search history.

(56) References Cited

U.S. PATENT DOCUMENTS

| 4,162,226 | A |   | 7/1979  | Chatterji |            |
|-----------|---|---|---------|-----------|------------|
| 5,302,672 | A | * | 4/1994  | Ogura     | C07C 37/20 |
|           |   |   |         |           | 525/481    |
| 5,458,195 | A |   | 10/1995 | Totten et al. |        |
| 5,503,936 | A | * | 4/1996  | Blyakhman | C08G 59/5033 |
|           |   |   |         |           | 428/413    |
| 5,569,324 | A |   | 10/1996 | Totten et al. |        |

(Continued)

OTHER PUBLICATIONS

Xu, et al., "Structural effect on Thermal Cure and Property on Naphthalene-based Epoxies: Preparation and Characterization" Macromolecular Chemistry and Physics, (2004) vol. 205, pp. 1559-1568.

(Continued)

*Primary Examiner* — Angela M DiTrani
*Assistant Examiner* — Anuradha Ahuja
(74) *Attorney, Agent, or Firm* — Craig W. Roddy; Tumey L.L.P.

(57) ABSTRACT

Disclosed are methods and compositions for cementing in a subterranean formation. A method comprises introducing a resin composition into a wellbore. The resin composition may comprise a resin, a napthol-based epoxy resin additive, and a hardening agent. The napthol-based epoxy resin additive may comprise two naphthalene functional groups and two epoxide functional groups.

11 Claims, 5 Drawing Sheets

(56) References Cited

U.S. PATENT DOCUMENTS

| | | | |
|---|---|---|---|
| 5,873,413 A | 2/1999 | Chatterji et al. | |
| 5,875,844 A | 3/1999 | Chatterji et al. | |
| 5,875,845 A | 3/1999 | Chatterji et al. | |
| 5,875,846 A | 3/1999 | Chatterji et al. | |
| 5,911,282 A | 6/1999 | Onan et al. | |
| 5,957,204 A | 9/1999 | Chatterji et al. | |
| 5,969,006 A | 10/1999 | Onan et al. | |
| 6,006,835 A | 12/1999 | Onan et al. | |
| 6,006,836 A | 12/1999 | Chatterji et al. | |
| 6,012,524 A * | 1/2000 | Chatterji | C09K 8/512 166/295 |
| 6,068,055 A | 5/2000 | Chatterji et al. | |
| 6,069,117 A | 5/2000 | Onan et al. | |
| 6,098,711 A | 8/2000 | Chatterji et al. | |
| 6,210,476 B1 | 4/2001 | Chatterji et al. | |
| 6,231,664 B1 | 5/2001 | Chatterji et al. | |
| 6,234,251 B1 | 5/2001 | Chatterji et al. | |
| 6,244,344 B1 | 6/2001 | Chatterji et al. | |
| 6,271,181 B1 | 8/2001 | Chatterji et al. | |
| 6,279,652 B1 | 8/2001 | Chatterji et al. | |
| 6,321,841 B1 | 11/2001 | Eoff et al. | |
| 6,328,106 B1 | 12/2001 | Griffith et al. | |
| 6,330,917 B2 | 12/2001 | Chatterji et al. | |
| 6,350,309 B2 | 2/2002 | Chatterji et al. | |
| 6,401,817 B1 | 6/2002 | Griffith et al. | |
| 6,448,206 B1 | 9/2002 | Griffith et al. | |
| 6,503,870 B2 | 1/2003 | Griffith et al. | |
| 6,516,883 B1 | 2/2003 | Chatterji et al. | |
| 6,555,507 B2 | 4/2003 | Chatterji et al. | |
| 6,593,402 B2 | 7/2003 | Chatterji et al. | |
| 6,979,366 B2 | 12/2005 | Chatterji et al. | |
| 7,093,658 B2 | 8/2006 | Chatterji et al. | |
| 7,943,706 B2 | 5/2011 | Kimura et al. | |
| 2001/0009133 A1 | 7/2001 | Chatterji et al. | |
| 2006/0154091 A1 | 7/2006 | Schmidt et al. | |
| 2007/0224362 A1* | 9/2007 | Briand | C04B 28/04 427/427.4 |
| 2009/0107632 A1* | 4/2009 | Lu | C09J 163/00 156/330 |
| 2009/0107676 A1 | 4/2009 | Saunders | |
| 2009/0272294 A1* | 11/2009 | Yamada | C03C 3/066 106/286.3 |
| 2010/0326660 A1* | 12/2010 | Ballard | C08G 59/5006 166/300 |
| 2011/0192598 A1* | 8/2011 | Roddy | E21B 33/13 166/253.1 |
| 2012/0049171 A1 | 3/2012 | Fukuda et al. | |
| 2012/0328377 A1* | 12/2012 | Brenneis | C04B 28/021 405/267 |

OTHER PUBLICATIONS

Kui et al. "Synthesis of Novel High Property Naphthyl Epoxy Systems", New Chemical Materials, (2009), vol. 37(9), pp. 112-115.
Cementing, "Weltock® Resin System," Halliburton product brochure.
DeepAssurance™ Cementing Solution Suite "WellLock(R) Resin System," Halliburton product brochure, 2014.
"Cementing: Hi-Dense® Weight Additives," Halliburton product brochure, 2007.
ETHACURE® 100 Curative, Albemarle product brochure, Jul. 2011.
JEFFAMINE® D-230 Polyetheramine, Hunstman Technical Bulletin, 2007.
D-AIR 3000™ and D-AIR 3000L™ Defomers—Cementing, Halliburton product brochure, Aug. 2007.
PCT Search Report and Written Opinion for PCT Application PCT/US2014/051248 dated Apr. 13, 2015.

* cited by examiner

NAPTHOL-BASED EPOXY RESIN ADDITIVES FOR USE IN WELL CEMENTING

BACKGROUND

Embodiments relate to epoxy resin additives for use in subterranean operations and, more particularly, to napthol-based epoxy resin additives for use with resin compositions and resin-cement composites as well as methods of using the resin additives in well cementing operations for subterranean formations.

In well operations, such as well construction and remedial cementing, cement compositions are commonly utilized. Cement compositions may be used in primary cementing operations whereby pipe strings, such as casing and liners, are cemented in wellbores. In a typical primary cementing operation, a cement composition may be pumped into an annulus between the exterior surface of the pipe string disposed therein and the walls of the wellbore (or a larger conduit in the wellbore). The cement composition may set in the annular space, thereby forming an annular sheath of hardened, substantially impermeable material (i.e., a cement sheath) that may support and position the pipe string in the wellbore and may bond the exterior surface of the pipe string to the wellbore walls (or the larger conduit). Amongst other things, the cement sheath surrounding the pipe string should function to prevent the migration of fluids in the annulus, as well as protect the pipe string from corrosion. Cement compositions also may be used in remedial cementing methods, such as in squeeze cementing for sealing voids in a pipe string, cement sheath, gravel pack, subterranean formation, and the like. Cement compositions may also be used in surface applications, for example, construction cementing.

Other types of compositions, including non-cementitious settable sealant compositions, such as resin-based sealants, may be used in the primary and/or remedial cementing operations described above. These compositions may be circulated through the well bore for use in any of the primary or remedial cementing operations used in the field. Additionally, resin compositions may be blended with traditional cement compositions to create resin-cement composites which may also be used in any type of primary or remedial cementing operation. Amongst the many uses for resins, applications in the oil and gas industry are unique in their demand for long resin pot life and controlled density.

It is well known that resins used in well cementing may only be used in formations where the bottomhole static temperature is lower than the glass transition temperature. For example, if resin compositions are deployed in formations where the bottomhole static temperature is greater than the glass transition temperature of the resin, the cured resin may have reduced compressive strength and decreased durability. Therefore, it may be difficult to use resin compositions in every operation site in which they may be desirable.

Resin fortifiers, such as methylenebisphosphonates are one attempted solution to this issue. However, the resin fortifiers may not form covalent bonds with the resin and thus their effectiveness may decrease over time. Another attempted solution is the use of epoxy resins with more than two epoxy groups. These resins form a denser epoxy network as compared to resins with two or less epoxy groups, however, they may also have high viscosities and short thickening times. As such, they may not be able to be successfully placed into subterranean formations.

BRIEF DESCRIPTION OF THE DRAWINGS

These drawings illustrate certain aspects of some of the embodiments of the present invention, and should not be used to limit or define the invention.

DETAILED DESCRIPTION

Figure 1:
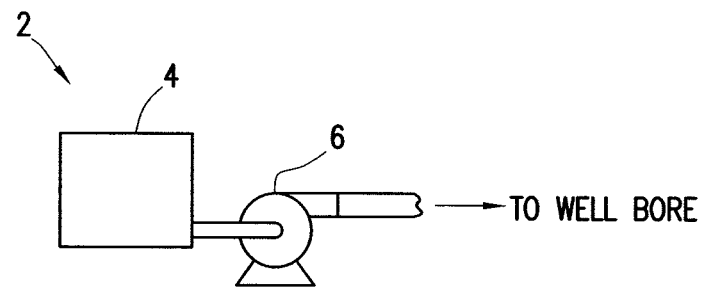
FIG. 1 is a schematic illustration of an example system for the preparation and delivery of a resin composition and/or a resin-cement composite into a wellbore.

Embodiments relate to epoxy resin additives for use in subterranean operations and, more particularly, the napthol-based epoxy resin additives for use with resin compositions and resin-cement composites as well as methods of using the resin additives in well cementing operations for subterranean formations. The napthol-based epoxy resin additives may comprise at least two epoxide groups and at least one naphthalene group. The napthol-based epoxy resin additives may increase the glass transition temperature of a resin composition so that the resin compositions and/or resin-cement composites may be used in subterranean formations with higher bottomhole static temperatures. One of the many potential advantages to these methods and compositions is the napthol-based epoxy additives may expand the range of subterranean formations in which the resin compositions and/or resin-cement composites may be used. Another potential advantage of these methods and compositions is that the napthol-based epoxy resin additives may increase the glass transition temperature of the resin compositions but may not increase the viscosity of the resin compositions and/or resin-cement composites or lower the thickening times of the resin compositions and/or resin-cement composites.

The resin compositions comprise a resin. Additionally, the resin compositions may be blended with cement compositions to form resin-cement composites. Alternatively, the resin compositions may be used alone, without blending with cement. The preparation of the resin-cement composites may generally comprise preformulating and preparing a resin composition and a cement composition and then blending the resin composition and the cement composition together prior to use. The blending may comprise any such blending used in the art, including blending via cement mixers. The resin compositions and the resin-cement composites may thicken to develop compressive strength and/or to form a seal when placed in a void or crack. Accordingly, the resin compositions and the resin-cement composites may function to provide a substantially impermeable barrier to seal off formation fluids and gases and consequently prevent potential fluid and gas migration into the annulus or the interior of the casing.

As used herein, the term "resin" refers to any of a number of physically similar polymerized synthetics or chemically modified natural resins including thermoplastic materials and thermosetting materials. Examples of resins that may be used in the resin compositions include, but are not limited to, epoxy-based resins, novolac resins, polyepoxide resins, phenol-aldehyde resins, urea-aldehyde resins, urethane resins, phenolic resins, furan/furfuryl alcohol resins, phenolic/latex resins, phenol formaldehyde resins, bisphenol A diglycidyl ether resins, butoxymethyl butyl glycidyl ether resins, bisphenol A-epichlorohydrin resins, bisphenol F resins, glycidyl ether resins, polyester resins and hybrids and copolymers thereof, polyurethane resins and hybrids and copolymers thereof, acrylate resins, and mixtures thereof. Some suitable resins, such as epoxy resins, may be cured with a hardening agent so that when pumped downhole, they may be cured using only time and temperature. Other suitable resins, such as furan resins generally require a time-delayed hardening agent to help activate the polymerization of the resins if the formation temperature is low (i.e., less than 250° F.), but will cure under the effects of time and temperature if the formation temperature is above about 250° F. One commercial example of a resin that may be used is the WellLock™ resin system, available from Halliburton Energy Services, Inc., of Houston, Tex.

The selection of a suitable resin may be affected by the temperature of the subterranean formation to which the resin composition will be introduced. By way of example, for subterranean formations having a bottomhole static temperature ("BHST") ranging from about 60° F. to about 250° F., two-component epoxy-based resins comprising a resin component and a hardening agent may be preferred. For subterranean formations having a BHST ranging from about 300° F. to about 600° F., a furan-based resin may be preferred. For subterranean formations having a BHST ranging from about 200° F. to about 400° F., either a phenolic-based resin or a one-component HT epoxy-based resin may be suitable. For subterranean formations having a BHST of at least about 175° F., a phenol/phenol formaldehyde/furfuryl alcohol resin may also be suitable. Those of ordinary skill in the art, with the benefit of this disclosure, should be able to select a resin for a particular application.

Generally, the resin may be included in the resin compositions in an amount in the range of about 5% to about 99% by volume of the resin composition. For example, the resin may be included in the resin compositions in an amount of about 60% to about 99% by volume of the resin composition. Factors that may affect this determination include the type of resin and potential hardening agent desired for a particular application. Those of ordinary skill in the art, with the benefit of this disclosure, should be able to select an amount of a resin for a particular application.

The resin compositions and the resin-cement composites generally should have a density suitable for a particular application as desired by those of ordinary skill in the art. Without being limited by theory, the density of the resin compositions and the resin-cement composites may be adjusted to achieve the proper density hierarchy for placement of the resin compositions and the resin-cement composites. As an example, the resin compositions and the resin-cement composites may have a density in the range of from about 5 pounds per gallon ("ppg") to about 20 ppg. In a further example, the resin compositions and the resin-cement composites may have a density in the range of about 8 ppg to about 14 ppg. In yet other examples, the resin compositions and the resin-cement composites may have a density in the range of about 10 ppg to about 12 ppg. Moreover, filler particles may be chosen which modify the mechanical properties of the set resin compositions and the resin-cement composites or the fluid properties of the liquid (uncured) resin compositions. Such filler particles may have the same density as the resin compositions and the resin-cement composites so that the bulk density is not changed. Examples of suitable filler particles may include, but are not limited to, aluminum oxide, awaruite, barium carbonate, barium oxide, barite, calcium carbonate, calcium oxide, cenospheres, chromite, chromium oxide, copper, copper oxide, dolomite, galena, hematite, hollow glass microspheres, ilmenite, iron oxide, siderite, magnetite, magnesium oxide, manganese carbonate, manganese dioxide, manganese (IV) oxide, manganese oxide, manganese tetraoxide, manganese (II) oxide, manganese (III) oxide, molybdenum (IV) oxide, molybdenum oxide, molybdenum trioxide, Portland cement, pumice, pyrite, spherelite, silica, silver, tenorite, titania, titanium (II) oxide, titanium (III) oxide, titanium (IV) dioxide, zirconium oxide, zirconium silicate, zinc oxide, cement-kiln dust, unexpanded and expanded perlite, attapulgite, bentonite, zeolite, elastomers, sand, micronized polymers, waxes, polymer fibers, inorganic fibers and any combination thereof. It should be noted that the foregoing list encompasses all crystal forms of any material. Those of ordinary skill in the art, with the benefit of this disclosure, should recognize the appropriate density of the resin compositions and the resin-cement composites for a particular application.

Without being limited by theory, resin compositions and resin-cement composites placed in subterranean formations with bottomhole static temperatures greater than the glass transition temperature of the resin may have reduced compressive strength and decreased durability. This effect may limit the use of resin compositions and resin-cement composites in high-temperature applications. Thus, it may be desirable to increase the glass transition temperature of the resin so as to expand the number of operation sites in which the resin may be used. Generally, a napthol-based epoxy resin additive may be employed to increase the glass transition temperature of the resin. Advantageously, napthol-based epoxy resin additives comprising at least one naphthalene group and at least two epoxide groups may increase the glass transition temperature of a resin, allowing the use of the resin in subterranean formations with bottomhole static temperatures that were previously too high for use of resin compositions. Further, the napthol-based epoxy resin additives may covalently bond with the other resin components in the resin systems such that the increase in glass transition temperature is permanent. Moreover, the use of napthol-based epoxy resin additives with two or less epoxide groups should not significantly shorten the thickening times of the resin compositions as compared to phenol-based epoxy resins with more than two epoxide groups.

The napthol-based epoxy resin additives may comprise at least one naphthalene functional group and at least two epoxide functional groups. The naphthalene functional group may have at least one substituted or unsubstituted ring. Generally, the epoxide groups may be bonded to the naphthalene functional groups at any position. Additionally, if the epoxy resin additives comprise other ring groups, for example phenyl groups, the epoxide groups may be bonded at any position to those groups at any position. The epoxide groups may be bonded to the naphthalene functional groups as epoxide functional groups, glycidyloxy (e.g., 2,3-epoxypropoxy) functional groups, 3,4-epoxycyclohexanecarboxylate functional groups, or the like. Without limitation, examples of the napthol-based epoxy resin additives may include 1,1-bis(2-glycidyloxy-1-naphthyl)alkanes, for example, 1,1-bis(2-glycidyloxy-1-naphthyl)methane, 1,1-bis(2-glycidyloxy-1-naphthyl)ethane, 1,1-bis(2-glycidyloxy-1-naphthyl)propane, 1,1-bis(2-glycidyloxy-1-naphthyl)butane, 1,1-bis(2-glycidyloxy-1-naphthyl)-1-phenylmethane, and 1,1-bis(2-glycidyloxy-1-naphthyl)-1-(4-glycidyloxyphenyl)methane; 1,1-bis(3,4-epoxycyclohexanecarboxylate-1-naphthyl)alkanes, for example, 1,1-bis(3,4-epoxycyclohexanecarboxylate-1-naphthyl)methane, 1,1-bis(3,4-epoxycyclohexanecarboxylate-1-naphthyl)ethane, 1, 1-bis(3,4-epoxycyclohexanecarboxylate-1-naphthyl)propane, 1,1-bis(3,4-epoxycyclohexanecarboxylate-1-naphthyl)butane, 1,1-bis(3,4-epoxycyclohexanecarboxylate-1-naphthyl)-1-phenylmethane, and 1,1-bis(3,4-epoxycyclohexanecarboxylate-1-naphthyl)-1-(4-glycidyloxyphenyl)methane; the like or combinations thereof. It is to be understood that the use a napthol-based epoxy resin additive comprising more than two epoxy groups may increase the viscosity and reduce the thickening time of the resin. As such, the napthol-based epoxy resin additive may negatively impact the use of the resin for applications requiring longer resin pot lives and controlled densities. Those of ordinary skill in the art, with the benefit of this disclosure, should be able to select an appropriate napthol-based epoxy resin additive for a particular application.

Generally, the napthol-based epoxy resin additives may be included in the resin compositions in an amount in the range of about 1% to about 40% by volume of the resin composition. For example, the napthol-based epoxy resin additives may be included in the resin compositions in an amount of about 10% to about 20% by volume of the resin composition. Factors that may affect this determination include the type of resin and potential hardening agent desired for a particular application, the glass transition temperature of the resin, the type of napthol-based epoxy resin additive, etc. Those of ordinary skill in the art, with the benefit of this disclosure, should be able to select an amount of a napthol-based epoxy resin additive for a particular application.

As discussed above and without limitation, the napthol-based epoxy resin additives may increase the glass transition temperature of a resin. The amount of the increase in the glass transition temperature is due to a variety of factors and can vary greatly because of these factors. Some of these factors include the type of resin, the glass transition temperature of the base resin, the number of naphthalene and epoxide groups in the napthol-based epoxy resin additive, the amount of the napthol-based epoxy resin additive used, etc. The increase in glass transition temperature will determine the range of subterranean formations in which the resin compositions and/or resin-cement composites comprising the napthol-based epoxy resin additives may be used. Although the napthol-based epoxy resin additives may increase the glass transition temperature of the resin in the resin compositions and the resin-cement composites, as a general rule, the increased glass transition temperature should still be greater than the bottomhole static temperature of the subterranean formation in order to prevent reduced compressive strength and durability.

Without being limited by theory, the napthol-based epoxy resin additives may covalently bond with the resin. The covalent bonding of the naphthol-based epoxy resin additives may create a permanent enhancement that should not degrade over time, as may happen with types of resin fortifiers that rely on weak interactions such as electrostatic interactions or hydrogen bonding. Thus, for napthol-based epoxy resin additives that successfully covalently bond into the resin network, the increase in the glass transition temperature should be permanent. This is of special importance in cementing operations in which the resin composition and/or the resin-cement composite is to remain in the wellbore or subterranean formation for an extended length of time.

The napthol-based epoxy resin additives may be prepared in any suitable manner. An example method of preparation comprises the epoxidation of a 1,1-bis(2-naphthol)alkane by reaction with an epihalohydrin. This synthesis may be done by dissolving the 1,1-bis(2-naphthol)alkane into the epihalohydrin using a phase transfer catalyst (e.g., a quaternary ammonium salt) and a base. The resulting product may be a 1,1-bis(2-glycidyloxy-1-naphthyl)alkane. Most epihalohydrins, bases, and phase transfer catalysts should work. Examples of a suitable epihalohydrin may include, but are not limited to, epichlorohydrin, epibromohydrin, and the like. Examples of a suitable base may include, but are not limited to, sodium hydroxide, potassium hydroxide, sodium carbonate, and the like. Examples of a suitable phase transfer catalyst may include, but are not limited to, tetrabutylammonium bromide, and the like. Any method of synthesis of the napthol-based epoxy resin additives may be used provided that any reaction byproducts that are not able to be removed will not interfere with the cementing applications.

Optionally, a diluent may be added to the resin compositions to reduce the viscosity of the resin compositions for ease of handling, mixing, and transferring. However, in some embodiments, it may be desirable to not use a diluent (e.g., for environmental or safety reasons). Factors that may affect this decision include geographic location of the well, the surrounding weather conditions, and the desired long-term stability of the well bore servicing fluid. Those of ordinary skill in the art, with the benefit of this disclosure, should be able to determine whether to use a diluent for a particular application.

Generally, any diluent that is compatible with the resin and that achieves the desired viscosity effect may be suitable for use in the resin compositions. Some diluents may be reactive, in that they are incorporated into the resin. Diluents that are reactive may comprise amine or epoxide functional groups. Suitable diluents may include, but are not limited to, butyl glycidyl ether, cyclohexane dimethanol diglycidyl ether, polyethylene glycol, butyl lactate, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, d'limonene, fatty acid methyl esters, or any combinations thereof. Selection of an appropriate diluent may be dependent on the resin composition and/or cement composition chosen. In some embodiments, the amount of the diluent used in the resin composition may be in the range of about 0.1% to about 30% by weight of the resin composition. Optionally, the resin composition may be heated to reduce its viscosity, in place of, or in addition to, using a diluent. Those of ordinary skill in the art, with the benefit of this disclosure, should be able to select a type of and the amount of a diluent for a particular application.

Optional embodiments may comprise a hardening agent. As used herein, "hardening agent" refers to any substance capable of transforming the resin into a hardened, consolidated mass. Examples of suitable hardening agents include, but are not limited to, aliphatic amines, aliphatic tertiary amines, aromatic amines, cycloaliphatic amines, heterocyclic amines, amido amines, polyamides, polyethyl amines, polyether amines, polyoxyalkylene amines, carboxylic anhydrides, triethylenetetraamine, ethylene diamine, N-cocoalkyltrimethylene, isophorone diamine, N-aminophenyl piperazine, imidazoline, 1,2-diaminocyclohexane, polytheramine, diethyltoluenediamine, 4,4'-diaminodiphenyl methane, methyltetrahydrophthalic anhydride, hexahydrophthalic anhydride, maleic anhydride, polyazelaic polyanhydride, phthalic anhydride, and combinations thereof. Commercial examples of hardening agents may include, but are not limited to, ETHACURE® 100 curative, available from Albemarle Corp. of Baton Rouge, La., and JEFFAMINE® D-230 polyetheramine, available from Huntsman Corp. of The Woodlands, Tex. The hardening agent may be included in the resin compositions in an amount sufficient to at least partially harden the resin compositions. In some examples, the hardening agent may be included in the resin compositions in the range of about 1% to about 95% by volume of the resin compositions. In other examples, the hardening agent may be included in the resin compositions in an amount of about 10% to about 40% by volume of the resin compositions. Generally, the amount of hardening agent is dictated by the resin chemistry and is calculated based on the resin chemistry, thus those of ordinary skill in the art, with the benefit of this disclosure, should be able to select a type of hardening agent and amount of hardening agent for a particular application.

The amount of hardening agent may be selected to impart a desired elasticity or compressibility. Without limitation, generally, the lower the amount of hardening agent present in the resin compositions, the greater the elasticity or compressibility will be. With the benefit of this disclosure, those of ordinary skill in the art should be able to select an appropriate amount of hardening agent to achieve a desired elasticity or compressibility for a particular application.

The hardening agent may comprise a mixture of hardening agents selected to impart particular qualities to the resin compositions. For example, the hardening agent may comprise a fast-setting hardening agent and a slow-setting hardening agent. As used herein, the terms "fast-setting hardening agent" and "slow-setting hardening agent" do not imply any specific rate at which the agents set a resin; instead, the terms merely indicate the relative rates at which the hardening agents initiate hardening of the resin. Whether a particular hardening agent is considered fast-setting or slow-setting may depend on the other hardening agent(s) with which it is used. In a specific example, ETHACURE® 100 may be used as a slow-setting hardening agent, and JEFFAMINE® D-230 may be used as a fast-setting hardening agent. The ratio of fast-setting hardening agent to slow-setting hardening agent may be selected to achieve a desired behavior of the hardening agent. For example, the fast-setting hardening agent may be included in a ratio of approximately 1:5, by volume, with the slow-setting hardening agent. Those of ordinary skill in the art, with the benefit of this disclosure, should be able to select a mixture of hardening agents for a particular application.

The hardening agent may also comprise an optional silane coupling agent. The silane coupling agent may be used, among other things, to act as a mediator to help bond the resin to the surface of the subterranean formation and/or the surface of the well bore. Examples of suitable silane coupling agents include, but are not limited to, N-2-(aminoethyl)-3-aminopropyltrimethoxysilane; 3-glycidoxypropyltrimethoxysilane; gamma-aminopropyltriethoxysilane; N-beta-(aminoethyl)-gamma-aminopropyltrimethoxysilanes; aminoethyl-N-beta-(aminoethyl)-gamma-aminopropyl-trimethoxysilanes; gamma-ureidopropyl-triethoxysilanes; beta-(3-4 epoxy-cyclohexyl)-ethyl-trimethoxysilane; gamma-glycidoxypropyltrimethoxysilanes; vinyltrichlorosilane; vinyltris (beta-methoxyethoxy) silane; vinyl tri ethoxysilane; vinyltrimethoxysilane; 3-metacryloxypropyltrimethoxysilane; beta-(3,4 epoxycyclohexyl)-ethyltrimethoxysilane; r-glycidoxypropyltrimethoxysilane; r-glycidoxypropylmethylidiethoxysilane; N-beta-(aminoethyl)-r-aminopropyl-trimethoxysilane; N-beta-(aminoethyl)-r-aminopropylmethyldimethoxysilane; 3-aminopropyl-triethoxysilane; N-phenyl-r-aminopropyltrimethoxysilane; r-mercaptopropyltrimethoxysilane; r-chloropropyltrimethoxysilane; vinyltrichlorosilane; vinyltris(beta-methoxyethoxy)silane; vinyltrimethoxysilane; r-metacryloxypropyltrimethoxysilane; beta-(3,4 epoxycyclohexyl)-ethyltrimethoxysila; r-glycidoxypropyltrimethoxysilane; r-glycidoxypropylmethylidiethoxysilane; N-beta-(aminoethyl)-r-aminopropyltrimethoxysilane; N-beta-(aminoethyl)-r-aminopropylmethyldimethoxysilane; r-aminopropyltriethoxysilane; N-phenyl-r-aminopropyltrimethoxysilane; r-mercaptopropyltrimethoxysilane; r-chloropropyltrimethoxysilane; N[3-(trimethoxysilyl)propyl]-ethylenediamine; substituted silanes where one or more of the substitutions contains a different functional group; or any combinations thereof. Generally, the silane coupling agent may be included in the hardening agent in an amount capable to sufficiently bond the resin. In some embodiments, the silane coupling agent may be included in the hardening agent in the range of about 0.1% to about 95% by volume of the hardening agent. Those of ordinary skill in the art, with the benefit of this disclosure, should be able to select a silane coupling agent for a particular application.

The resin compositions may be prepared in accordance with any suitable technique. As an example, the desired quantity of resin may be introduced into a mixer (e.g., a batch mixer) prior to or followed by the addition of any optional hardening agent and/or diluent. Additional additives, if any, may be added to the mixer as desired prior to, or after, the addition of the resin to the mixer. This mixture may be agitated for a sufficient period of time. By way of example, pumps may be used for delivery of the resin composition into the wellbore. As will be appreciated by those of ordinary skill in the art, with the benefit of this disclosure, other suitable techniques for preparing the resin composition may be used in accordance with embodiments.

The resin compositions may be preformulated, prepared, and then blended with cement compositions comprising water and any of a variety of hydraulic cements to create resin-cement composites. Suitable examples of hydraulic cements include those that comprise calcium, aluminum, silicon, oxygen and/or sulfur, which set and harden by reaction with water. Examples of such hydraulic cements, include, but are not limited to, Portland cements, pozzolana cements, gypsum cements, high-alumina-content cements, slag cements, silica cements, and combinations thereof. Suitable Portland cements may be classified as Classes A, C, H, or G cements according to the American Petroleum Institute, *API Specification for Materials and Testing for Well Cements*, API Specification 10, Fifth Ed., Jul. 1, 1990. In addition, the hydraulic cement may include cements classified as ASTM Type I, II, or III.

Water used in the cement compositions may include, for example, freshwater, saltwater (e.g., water containing one or more salts dissolved therein), brine (e.g., saturated saltwater produced from subterranean formations), seawater, or any combination thereof. Generally, the water may be from any source, provided that the water does not contain an excess of compounds that may undesirably affect other components in the resin-cement composite. The water may be included in an amount sufficient to form a pumpable slurry. The water may be included in the cement compositions in an amount in the range of from about 40% to about 200% by weight of the hydraulic cement ("bwoc") and, alternatively, in an amount in a range of from about 40% to about 150% bwoc. By way of further example, the water may be present in an amount ranging between any of and/or including any of about 40%, about 50%, about 60%, about 70%, about 80%, about 90%, about 100%, about 110%, about 120%, about 130%, about 140%, about 150%, about 160%, about 170%, about 180%, about 190%, or about 200% bwoc. One of ordinary skill in the art, with the benefit of this disclosure, should recognize the appropriate amount of water to include for a chosen application.

A wide variety of additional additives may be included in the resin compositions and/or the resin-cement composites as deemed appropriate by one skilled in the art, with the benefit of this disclosure. Examples of such additives include, but are not limited to: supplementary settable or cementitious materials, weighting agents, viscosifying agents (e.g., clays, hydratable polymers, diutan, xanthan gum, and cellulose derivatives or any combination thereof), fluid loss control additives, lost circulation materials, filtration control additives, dispersants, foaming additives, defoamers, corrosion inhibitors, scale inhibitors, formation conditioning agents, and water-wetting surfactants. Water-wetting surfactants may be used to aid in removal of oil from surfaces in the wellbore (e.g., the casing) to enhance cement and resin bonding. Specific examples of these, and other, additives include: organic polymers, biopolymers, latex, ground rubber, surfactants, crystalline silica, amorphous silica, silica flour, fumed silica, nano-clays (e.g., clays having at least one dimension less than 100 nm), salts, fibers, hydratable clays, microspheres, rice husk ash, micro-fine cement (e.g., cement having an average particle size of from about 5 microns to about 10 microns), metakaolin, zeolite, shale, pumice, perlite, barite, slag, lime (e.g., hydrated lime), gypsum, any combinations thereof, and the like. A person having ordinary skill in the art, with the benefit of this disclosure, should readily be able to determine the type and amount of additive useful for a particular application and desired result.

Weighting agents are typically materials that weigh more than water and may be used to increase the density of the resin compositions and/or the resin-cement composites. By way of example, weighting agents may have a specific gravity of about 2 or higher (e.g., about 2, about 4, etc.). Examples of weighting agents that may be used include, but are not limited to, hematite, hausmannite, barite, and combinations thereof. Specific examples of suitable weighting agents include HI-DENSE® weighting agent, available from Halliburton Energy Services, Inc.

Lightweight additives may be included in the resin-cement composites to, for example, decrease the density of the resin-cement composites. Examples of suitable lightweight additives include, but are not limited to, bentonite, coal, diatomaceous earth, expanded perlite, fly ash, gilsonite, hollow microspheres, low-density elastic beads, nitrogen, pozzolan-bentonite, sodium silicate, combinations thereof, or other lightweight additives known in the art. The resin compositions may generally have lower base densities than the resin-cement composites, thus hollow glass beads and/or foam may be suitable lightweight additives for the resin compositions, dependent upon the base densities of the resin compositions.

Optionally, cement foaming additives may be included in the resin-cement composites, for example, to facilitate foaming and/or stabilize the resultant foam formed therewith. The foaming additive may include a surfactant or combination of surfactants that reduce the surface tension of the water. As will be appreciated by those of ordinary skill in the art, the foaming additives may be used in conjunction with a gas to produce a foamed resin-cement composite. By way of example, the foaming agent may comprise an anionic, nonionic, amphoteric (including zwitterionic surfactants), cationic surfactant, or mixtures thereof. Examples of suitable foaming additives include, but are not limited to: betaines; anionic surfactants such as hydrolyzed keratin; amine oxides such as alkyl or alkene dimethyl amine oxides; cocoamidopropyl dimethylamine oxide; methyl ester sulfonates; alkyl or alkene amidobetaines such as cocoamidopropyl betaine; alpha-olefin sulfonates; quaternary surfactants such as trimethyltallowammonium chloride and trimethylcocoammonium chloride; C8 to C22 alkylethoxylate sulfates; and combinations thereof. Specific examples of suitable foaming additives include, but are not limited to: mixtures of an ammonium salt of an alkyl ether sulfate, a cocoamidopropyl betaine surfactant, a cocoamidopropyl dimethylamine oxide surfactant, sodium chloride, and water; mixtures of an ammonium salt of an alkyl ether sulfate surfactant, a cocoamidopropyl hydroxysultaine surfactant, a cocoamidopropyl dimethylamine oxide surfactant, sodium chloride, and water; hydrolyzed keratin; mixtures of an ethoxylated alcohol ether sulfate surfactant, an alkyl or alkene amidopropyl betaine surfactant, and an alkyl or alkene dimethylamine oxide surfactant; aqueous solutions of an alpha-olefinic sulfonate surfactant and a betaine surfactant; and combinations thereof. An example of a suitable foaming additive is ZONESEALANT™ 2000 agent, available from Halliburton Energy Services, Inc.

Optionally, cement strength-retrogression additives may be included in the resin-cement composites, for example, to further prevent the retrogression of strength after the resin-cement composites have been allowed to develop compressive strength. These additives may allow the resin-cement composites to form as intended, preventing cracks and premature failure. Examples of suitable strength-retrogression additives may include, but are not limited to, amorphous silica, coarse grain crystalline silica, fine grain crystalline silica, or a combination thereof.

Optionally, set accelerators for cement may be included in the resin-cement composites, for example, to increase the rate of setting reactions. Control of setting time may allow for the ability to adjust to wellbore conditions or customize set times for individual jobs. Examples of suitable set accelerators may include, but are not limited to, aluminum sulfate, alums, calcium chloride, calcium sulfate, gypsum-hemihydrate, sodium aluminate, sodium carbonate, sodium chloride, sodium silicate, sodium sulfate, ferric chloride, or a combination thereof.

Optionally, set accelerators for resin may be included in the resin compositions, for example, to increase the rate of setting reactions. Control of setting time may allow for the ability to adjust to wellbore conditions or customize set times for individual jobs. Examples of suitable set accelerators may include, but are not limited to tertiary amines (including 2,4,6-tris(dimethylaminomethyl)phenol, benzyl dimethylamine, and 1,4-diazabicyclo[2.2.2]octane), imidazole and its derivatives (e.g., 2-ethyl,-4-methylimidazole, 2-methylimidazole, 1-(2-cyanoethyl)-2-ethyl-4-methylimidazole), Lewis acid catalysts (e.g. aluminum chloride, boron trifluoride, boron trifluoride ether complexes, boron trifluoride alcohol complexes, boron trifluoride amine complexes), and metal salts (e.g. $ZnCl_2$, Zn (II) acetate, $FeCl_3$) or a combination thereof.

Optionally, set retarders for cement may be included in the resin-cement composites, for example, to increase the thickening time. Examples of suitable set retarders include, but are not limited to, ammonium, alkali metals, alkaline earth metals, borax, metal salts of calcium lignosulfonate, carboxymethyl hydroxyethyl cellulose, sulfoalkylated lignins, hydroxycarboxy acids, copolymers of 2-acrylamido-2-methylpropane sulfonic acid salt and acrylic acid or maleic acid, saturated salt, or a combination thereof. One example of a suitable sulfoalkylated lignin comprises a sulfomethylated lignin.

Optionally, gas-generating additives for cement may be included in the resin-cement composites to release gas at a predetermined time, which may be beneficial to prevent gas migration from the formation through the resin-cement composites before they harden. The generated gas may combine with or inhibit the permeation of the resin-cement composites by formation gas. Examples of suitable gas-generating additives include, but are not limited to, metal particles (e.g., aluminum powder) that react with an alkaline solution to generate a gas.

Optionally, mechanical-property-enhancing additives for cement may be included in the resin-cement composites, for example, to ensure adequate compressive strength and long-term structural integrity. These properties can be affected by the strains, stresses, temperature, pressure, and impact effects from a subterranean environment. Examples of mechanical-property-enhancing additives include, but are not limited to, carbon fibers, glass fibers, metal fibers, mineral fibers, silica fibers, polymeric elastomers, latexes, and combinations thereof.

Optionally, lost-circulation materials may be included in the resin compositions and/or the resin-cement composites, for example, to help prevent the loss of fluid circulation into the subterranean formation. Examples of lost-circulation materials include but are not limited to, cedar bark, shredded cane stalks, mineral fiber, mica flakes, cellophane, calcium carbonate, ground rubber, polymeric materials, pieces of plastic, grounded marble, wood, nut hulls, melamine laminates (e.g., Formica® laminate), corncobs, cotton hulls, and combinations thereof.

Optionally, fluid-loss-control additives for cement may be included in the resin-cement composites, for example, to decrease the volume of fluid that is lost to the subterranean formation. Properties of the resin-cement composites may be significantly influenced by their water content. The loss of fluid can subject the resin-cement composites compositions to degradation or complete failure of design properties. Examples of suitable fluid-loss-control additives include, but not limited to, certain polymers, such as hydroxyethyl cellulose, carboxymethylhydroxyethyl cellulose, copolymers of 2-acrylamido-2-methylpropanesulfonic acid and acrylamide or N,N-dimethylacrylamide, and graft copolymers comprising a backbone of lignin or lignite and pendant groups comprising at least one member selected from the group consisting of 2-acrylamido-2-methylpropanesulfonic acid, acrylonitrile, and N,N-dimethylacrylamide.

Optionally, cement defoaming additives may be included in the resin-cement composites, for example, to reduce the tendency of the resin-cement composites to foam during mixing and pumping of the resin-cement composites. Examples of suitable defoaming additives include, but are not limited to, polyol silicone compounds. Suitable defoaming additives are available from Halliburton Energy Services, Inc., under the product name D-Air defoamers.

Optionally, thixotropic additives may be included in the resin compositions and/or the resin-cement composites, for example, to provide a resin composition and/or resin-cement composite that can be pumpable as a thin or low viscosity fluid, but when allowed to remain quiescent attains a relatively high viscosity. Among other things, thixotropic additives may be used to help control free water, create rapid gelation as the slurry sets, combat lost circulation, prevent "fallback" in annular column, and minimize gas migration. Examples of suitable thixotropic additives include, but are not limited to, gypsum, water soluble carboxyalkyl, hydroxyalkyl, mixed carboxyalkyl hydroxyalkyl either of cellulose, polyvalent metal salts, zirconium oxychloride with hydroxyethyl cellulose, or a combination thereof.

As will be appreciated by those of ordinary skill in the art, the resin compositions and/or the resin-cement composites may be used in a variety of subterranean operations, including primary and remedial cementing. In some embodiments, a resin composition may be provided that comprises resin, a napthol-based epoxy resin additive, and optionally a hardening agent, accelerator and/or diluent. The resin composition may be introduced into a subterranean formation and allowed to set therein. As used herein, introducing the resin composition into a subterranean formation includes introduction into any portion of the subterranean formation, including, without limitation, into a wellbore drilled into the subterranean formation, into a near wellbore region surrounding the wellbore, or into both.

In primary cementing, for example, the resin compositions and/or the resin-cement composites may be introduced into an annular space between a conduit located in a wellbore and the walls of a wellbore (and/or a larger conduit in the wellbore), wherein the wellbore penetrates the subterranean formation. The resin compositions and/or the resin-cement composites may be allowed to set in the annular space to form an annular sheath of hardened resin and/or hardened resin-cement. The resin compositions and/or the resin-cement composites may form a barrier that prevents the migration of fluids in the wellbore. The resin compositions and/or the resin-cement composites may also, for example, support the conduit in the wellbore.

In remedial cementing, for example, the resin compositions and/or the resin-cement composites may be used, for example, in squeeze-cementing operations. By way of example, the resin compositions and/or the resin-cement composites may be placed in a wellbore to plug a void or crack in the formation, in a gravel pack, in the conduit, in the cement sheath, and/or in a microannulus between the cement sheath and the conduit.

Another example method comprises sealing a portion of a gravel pack or a portion of a subterranean formation. The method may comprise providing a resin composition and/or a resin-cement composite; introducing the resin composition and/or the resin-cement composite into the portion of the gravel pack or the portion of the subterranean formation; and allowing the resin composition to form a hardened mass in said portion. The portions of the subterranean formation may include permeable portions of the formation, fractures (natural or otherwise) in the formation, and other portions of the formation that may allow the undesired flow of fluid into, or from, the wellbore. The portions of the gravel pack include those portions of the gravel pack, wherein it is desired to prevent the undesired flow of fluids into, or from, the wellbore. Among other things, this method may allow the sealing of the portion of the gravel pack to prevent the undesired flow of fluids without requiring the gravel pack's removal.

Another example method may comprise sealing voids located in a pipe string (e.g., casing, expandable casings, liners, etc.) or in a cement sheath. Generally, the pipe string will be disposed in a wellbore, and the cement sheath may be located in the annulus between the pipe string disposed in the well bore and a wall of the well bore. An example of such a method may comprise providing a resin composition and/or a resin-cement composite; introducing the resin composition and/or the resin-cement composite into the void; and allowing the resin composition and/or the resin-cement composite to set to form a hardened mass in the void.

When sealing a void in a pipe string, some methods may comprise locating the void in the pipe string; and isolating the void by defining a space within the pipe string in communication with the void; wherein the resin composition and/or the resin-cement composite may be introduced into the void from the space. The void may be isolated using any suitable technique and/or apparatus, including bridge plugs, packers, and the like. The void in the pipe string may be located using any suitable technique.

When sealing a void in the cement sheath, some methods may comprise locating the void in the cement sheath; producing a perforation in the pipe string that intersects the void; and isolating the void by defining a space within the pipe string in communication with the void via the perforation, wherein the resin composition and/or the resin-cement composite is introduced into the void via the perforation. The void in the pipe string may be located using any suitable technique. The perforation may be created in the pipe string using any suitable technique, for example, perforating guns. The void may be isolated using any suitable technique and/or apparatus, including bridge plugs, packers, and the like.

Another example method may comprise consolidating a formation that is weak or loose. This may comprise providing a resin composition and/or a resin-cement composite and pumping the resin composition and/or the resin-cement composite into the weak or loose parts of the formation. Alternatively, the resin composition and/or the resin-cement composite may be pumped into a section adjacent to the weak or loose part of the formation and be allowed to flow into the weak or loose part of the formation. The resin composition and/or the resin-cement composite may then be allowed to set.

A method may comprise introducing a resin composition into a wellbore, wherein the resin composition comprises a resin, a napthol-based epoxy resin additive, and a hardening agent, wherein the napthol-based epoxy resin additive comprises two naphthalene functional groups and two epoxide functional groups. The napthol-based epoxy resin additive may comprise a resin additive selected from the group consisting of 1,1-bis(2-glycidyloxy-1-naphthyl)alkane, 1-(2,7-diglycidyloxy-1-naphthyl)-1-(2-glycidyloxy-1-naphthyl)alkane, 1,1-bis(2,7-diglycidyloxy-1-naphthyl)alkane, and any combination thereof. The napthol-based epoxy resin additive may comprise 1,1-bis(2-glycidyloxy-1-naphthyl)methane. The napthol-based epoxy resin additive may be present in an amount of about 1% to about 40/%. The resin may be selected from the group consisting of an epoxy-based resin, a novolac resin, a polyepoxide resin, a phenol-aldehyde resin, a urea-aldehyde resin, a urethane resin, a phenolic resin, a furan/furfuryl alcohol resin, a phenolic/latex resin, a phenol formaldehyde resin, a bisphenol A diglycidyl ether resin, a butoxymethyl butyl glycidyl ether resin, a bisphenol A-epichlorohydrin resin, a bisphenol F resin, a glycidyl ether resin, a polyester resin and a hybrid and copolymer thereof, a polyurethane resin and a hybrid and copolymer thereof, an acrylate resin, and any combination thereof. The hardening agent may be selected from the group consisting of an aliphatic amine, an aliphatic tertiary amine, an aromatic amine, a cycloaliphatic amine, a heterocyclic amine, an amido amine, a polyamide, a polyethyl amine, a polyether amine, a polyoxyalkylene amine, a carboxylic anhydride, triethylenetetramine, ethylene diamine, N-cocoalkyltrimethylene, isophorone diamine, N-aminophenyl piperazine, imidazoline, 1,2-diaminocyclohexane, polytheramine, diethyltoluenediamine, 4,4'-diaminodiphenyl methane, methyltetrahydrophthalic anhydride, hexahydrophthalic anhydride, maleic anhydride, polyazelaic polyanhydride, phthalic anhydride, and any combination thereof. The resin composition may comprise a diluent. The diluent may be selected from the group consisting of butyl glycidyl ether, cyclohexane dimethanol diglycidyl ether, polyethylene glycol, butyl lactate, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, d'limonene, fatty acid methyl esters, and any combinations thereof. At least a portion of the resin composition may be allowed to enter into and harden in a perforation in a casing within a wellbore. At least a portion of the resin composition may be allowed to enter into and harden in a perforation in a cement sheath within a wellbore. The resin composition may be used in primary cementing. A resin composition and a cement composition may be blended, wherein the cement composition comprises water and hydraulic cement.

A composition may comprise a resin, a napthol-based epoxy resin additive, and a hardening agent. The napthol-based epoxy resin additive may comprise a resin additive selected from the group consisting of 1,1-bis(2-glycidyloxy-1-naphthyl)alkane, 1-(2,7-diglycidyloxy-1-naphthyl)-1-(2-glycidyloxy-1-naphthyl)alkane, 1,1-bis(2,7-diglycidyloxy-1-naphthyl)alkane, and any combination thereof. The napthol-based epoxy resin additive may comprise 1,1-bis(2-glycidyloxy-1-naphthyl)methane. The napthol-based epoxy resin additive may be present in an amount of about 1% to about 40%. The resin may be selected from the group consisting of an epoxy-based resin, a novolac resin, a polyepoxide resin, a phenol-aldehyde resin, a urea-aldehyde resin, a urethane resin, a phenolic resin, a furan/furfuryl alcohol resin, a phenolic/latex resin, a phenol formaldehyde resin, a bisphenol A diglycidyl ether resin, a butoxymethyl butyl glycidyl ether resin, a bisphenol A-epichlorohydrin resin, a bisphenol F resin, a glycidyl ether resin, a polyester resin and a hybrid and copolymer thereof, a polyurethane resin and a hybrid and copolymer thereof, an acrylate resin, and any combination thereof. The hardening agent may be selected from the group consisting of an aliphatic amine, an aliphatic tertiary amine, an aromatic amine, a cycloaliphatic amine, a heterocyclic amine, an amido amine, a polyamide, a polyethyl amine, a polyether amine, a polyoxyalkylene amine, a carboxylic anhydride, triethylenetetramine, ethylene diamine, N-cocoalkyltrimethylene, isophorone diamine, N-aminophenyl piperazine, imidazoline, 1,2-diaminocyclohexane, polytheramine, diethyltoluenediamine, 4,4'-diaminodiphenyl methane, methyltetrahydrophthalic anhydride, hexahydrophthalic anhydride, maleic anhydride, polyazelaic polyanhydride, phthalic anhydride, and any combination thereof. The resin composition may comprise a diluent. The diluent may be selected from the group consisting of butyl glycidyl ether, cyclohexane dimethanol diglycidyl ether, polyethylene glycol, butyl lactate, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, d'limonene, fatty acid methyl esters, and any combinations thereof. At least a portion of the resin composition may be allowed to enter into and harden in a perforation in a casing within a wellbore. At least a portion of the resin composition may be allowed to enter into and harden in a perforation in a cement sheath within a wellbore. The resin composition may be used in primary cementing. A resin composition and a cement composition may be blended, wherein the cement composition comprises water and hydraulic cement.

A system may comprise a resin composition comprising a resin, a napthol-based epoxy resin additive, and a hardening agent; mixing equipment capable of mixing the resin composition; and pumping equipment capable of delivering the resin composition into a wellbore. The napthol-based epoxy resin additive may comprise a resin additive selected from the group consisting of 1,1-bis(2-glycidyloxy-1-naphthyl)alkane, 1-(2,7-diglycidyloxy-1-naphthyl)-1-(2-glycidyloxy-1-naphthyl)alkane, 1,1-bis(2,7-diglycidyloxy-1-naphthyl)alkane, and any combination thereof. The napthol-based epoxy resin additive may comprise 1,1-bis(2-glycidyloxy-1-naphthyl)methane. The napthol-based epoxy resin additive may be present in an amount of about 1% to about 40%. The resin may be selected from the group consisting of an epoxy-based resin, a novolac resin, a polyepoxide resin, a phenol-aldehyde resin, a urea-aldehyde resin, a urethane resin, a phenolic resin, a furan/furfuryl alcohol resin, a phenolic/latex resin, a phenol formaldehyde resin, a bisphenol A diglycidyl ether resin, a butoxymethyl butyl glycidyl ether resin, a bisphenol A-epichlorohydrin resin, a bisphenol F resin, a glycidyl ether resin, a polyester resin and a hybrid and copolymer thereof, a polyurethane resin and a hybrid and copolymer thereof, an acrylate resin, and any combination thereof. The hardening agent may be selected from the group consisting of an aliphatic amine, an aliphatic tertiary amine, an aromatic amine, a cycloaliphatic amine, a heterocyclic amine, an amido amine, a polyamide, a polyethyl amine, a polyether amine, a polyoxyalkylene amine, a carboxylic anhydride, triethylenetetramine, ethylene diamine, N-cocoalkyltrimethylene, isophorone diamine, N-aminophenyl piperazine, imidazoline, 1,2-diaminocyclohexane, polytheramine, diethyltoluenediamine, 4,4'-diaminodiphenyl methane, methyltetrahydrophthalic anhydride, hexahydrophthalic anhydride, maleic anhydride, polyazelaic polyanhydride, phthalic anhydride, and any combination thereof. The resin composition may comprise a diluent. The diluent may be selected from the group consisting of butyl glycidyl ether, cyclohexane dimethanol diglycidyl ether, polyethylene glycol, butyl lactate, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, d'limonene, fatty acid methyl esters, and any combinations thereof. At least a portion of the resin composition may be allowed to enter into and harden in a perforation in a casing within a wellbore. At least a portion of the resin composition may be allowed to enter into and harden in a perforation in a cement sheath within a wellbore. The resin composition may be used in primary cementing. A resin composition and a cement composition may be blended, wherein the cement composition comprises water and hydraulic cement.

Example methods of using the resin compositions or the resin-cement composites will now be described in more detail with reference to FIGS. 1-6. Any of the previous embodiments of the resin compositions and the resin-cement composites may apply in the context of FIGS. 1-6. Referring now to FIG. 1, the preparation of a resin composition or a resin-cement composite in accordance with example embodiments will now be described. FIG. 1 illustrates a system 2 for the preparation of either a resin composition or a resin-cement composite and subsequent delivery of the resin composition or the resin-cement composite to a wellbore in accordance with certain embodiments. As shown, the resin composition or the resin-cement composite may be mixed in mixing equipment 4, such as a jet mixer, re-circulating mixer, or a batch mixer, for example, and then pumped via pumping equipment 6 to the wellbore. In some embodiments, the mixing equipment 4 and the pumping equipment 6 may be disposed on one or more cement trucks as will be apparent to those of ordinary skill in the art. If a resin-cement composite is to be used, a resin composition and a cement composition are to be preformulated and prepared. The individual resin composition and cement composition may be mixed in mixing equipment 4 or in other mixing equipment. Once individually prepared, the resin composition and cement composition may be blended together in mixing equipment 4 before being pumped via pumping equipment 6.

Figure 2:
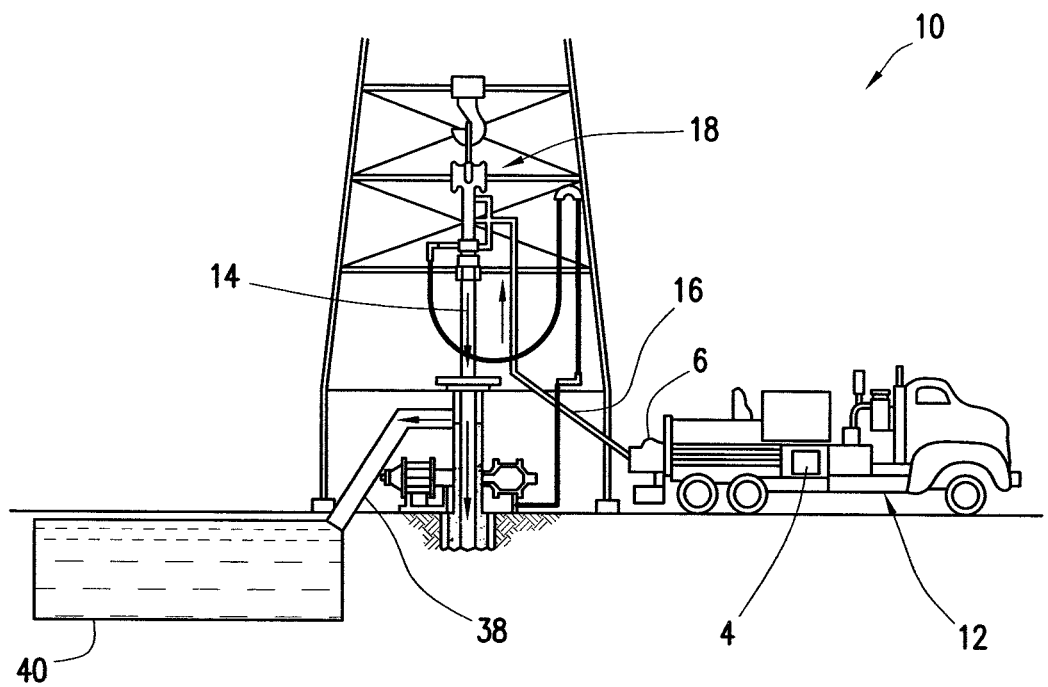
FIG. 2 is a schematic illustration of example surface equipment that may be used in the placement of a resin composition and/or a resin-cement composite into a wellbore.

An example primary cementing technique using a resin composition will now be described with reference to FIGS. 2 and 3. FIG. 2 illustrates surface equipment 10 that may be used in the placement of a resin composition or a resin-cement composite in accordance with certain embodiments. It should be noted that while FIG. 2 generally depicts a land-based operation, those skilled in the art will readily recognize that the principles described herein are equally applicable to subsea operations that employ floating or sea-based platforms and rigs, without departing from the scope of the disclosure. As illustrated by FIG. 2, the surface equipment 10 may include a cementing unit 12, which may include one or more cement trucks. The cementing unit 12 may include mixing equipment 4 and pumping equipment 6 (e.g., FIG. 1) as will be apparent to those of ordinary skill in the art. Cementing unit 12, or multiple cementing units 12, may pump a resin composition 14, or alternatively a or a resin-cement composite, (as shown in FIG. 3) through a feed pipe 16 and to a cementing head 18 which conveys resin composition 14 downhole.

Figure 3:
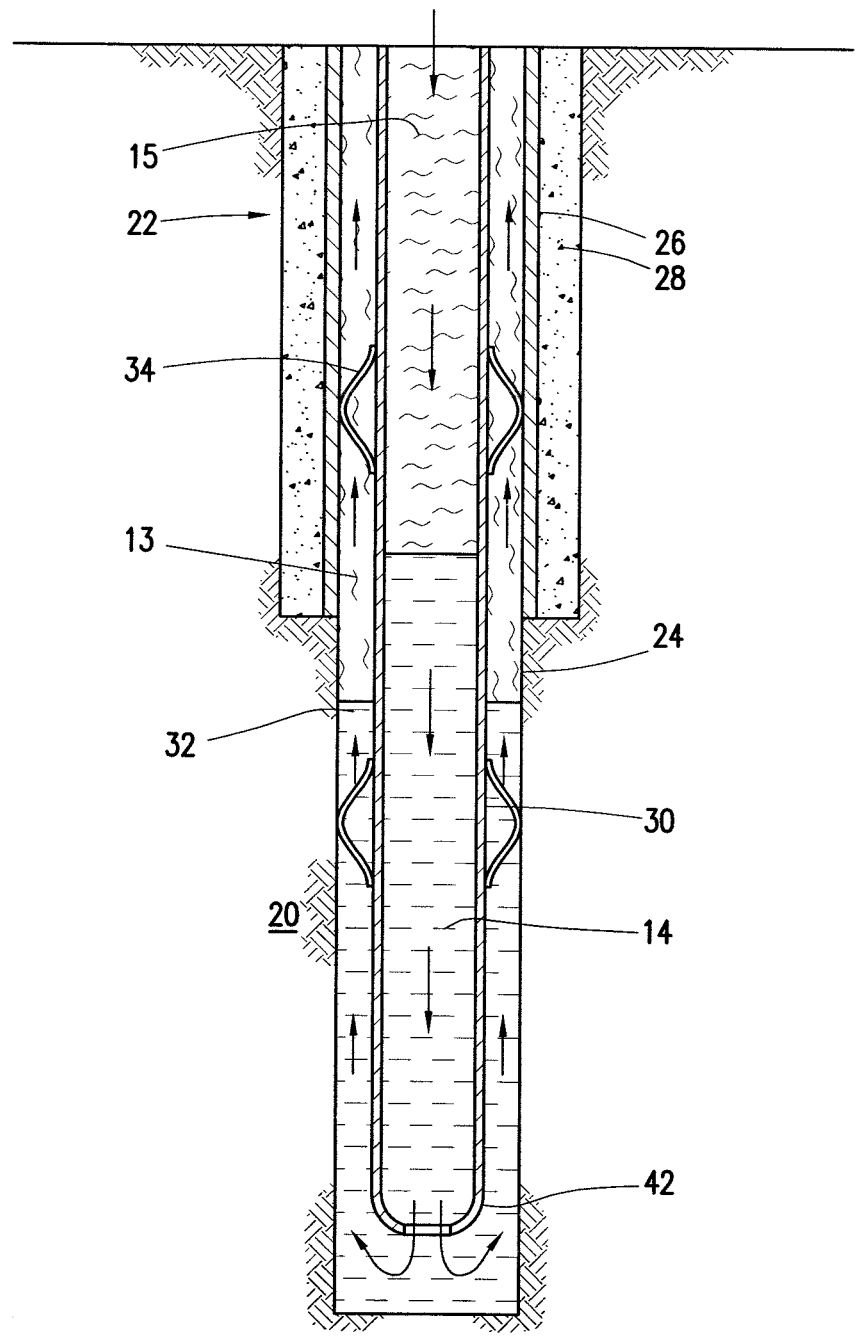
FIG. 3 is a schematic illustration of an example in which a resin composition and/or a resin-cement composite is used in a primary cementing application.

FIG. 3 generally depicts the placement of resin composition 14 into a subterranean formation 20 in accordance with example embodiments. As illustrated, a wellbore 22 may be drilled into the subterranean formation 20. While wellbore 22 is shown extending generally vertically into the subterranean formation 20, the principles described herein are also applicable to wellbores that extend at an angle through the subterranean formation 20, such as horizontal and slanted wellbores. As illustrated, the wellbore 22 comprises walls 24. In the illustrated embodiment, a surface casing 26 has been inserted into the wellbore 22. The surface casing 26 may be cemented in the wellbore 22 by a cement sheath 28. In alternative embodiments, surface casing 26 may be secured in the wellbore 22 by a hardened resin or hardened resin-cement composite sheath in place of cement sheath 28. In the illustrated embodiment, one or more additional conduits (e.g., intermediate casing, production casing, liners, etc.), shown here as casing 30 may also be disposed in the wellbore 22. As illustrated, there is a wellbore annulus 32 formed between the casing 30 and the walls 24 of the wellbore 22 and/or the surface casing 26. One or more centralizers 34 may be attached to the casing 30, for example, to centralize the casing 30 in the wellbore 22 prior to and during the cementing operation.

With continued reference to FIG. 3, a first spacer fluid 13 may be pumped down the interior of the casing 30. The first spacer fluid 13 may be allowed to flow down the interior of the casing 30 through the casing shoe 42 at the bottom of the casing 30 and up around the casing 30 into the wellbore annulus 32. After the first spacer fluid 13 has been pumped into the casing 30, resin composition 14 may be pumped into the casing 30. In a manner similar to pumping the first spacer fluid 13, the resin composition 14 may be allowed to flow down the interior of the casing 30 through the casing shoe 42 at the bottom of the casing 30 and up around the casing 30 into the wellbore annulus 32. After the resin composition 14 has been pumped into the casing 30, a second spacer fluid 15 may be pumped into casing 30 and allowed to flow down the interior of the casing 30. The first spacer fluid 13 and the second spacer fluid 15 may be used to separate the resin composition 14 from fluids introduced into the wellbore 22 either in front of or behind the resin composition 14. Once the resin composition 14 has been placed into the desired position in the wellbore annulus 32, the resin composition 14 may be allowed to set in the wellbore annulus 32, for example, to form a hardened resin sheath that supports and positions the casing 30 in the wellbore 22. Alternatively, one or no spacer fluids may be used, and resin composition 14 may not need to be separated from other fluids introduced previously or subsequently into wellbore 22. While not illustrated, other techniques may also be utilized for introduction of the resin composition 14. By way of example, reverse circulation techniques may be used that include introducing the resin composition 14 into the subterranean formation 20 by way of the wellbore annulus 32 instead of through the casing 30. These techniques may also utilize a first spacer fluid 13 and a second spacer fluid 15, or they may utilize one or none spacer fluids. As it is introduced, the resin composition 14 may displace the first spacer fluid 13. At least a portion of the first spacer fluid 13 may exit the wellbore annulus 32 via a flow line 38 and be deposited, for example, in one or more retention pits 40 (e.g., a mud pit), as shown on FIG. 2.

Figure 4:
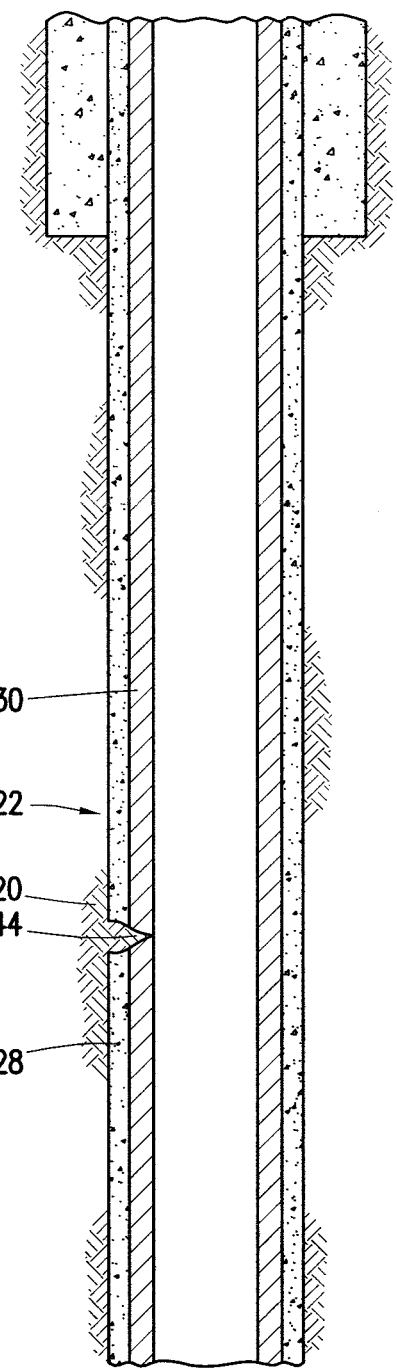
FIG. 4 is a schematic illustration showing the presence of a small perforation in a casing and cement sheath in a wellbore.
Figure 5:
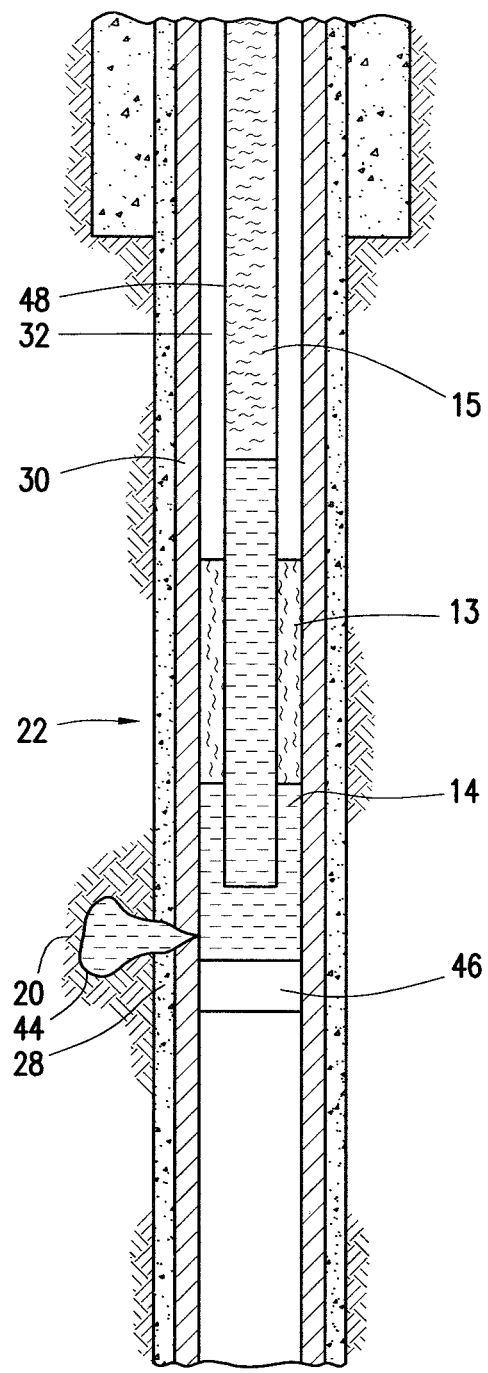
FIG. 5 is a schematic illustration of an example in which a resin composition and/or a resin-cement composite is used in a remedial cementing application.
Figure 6:
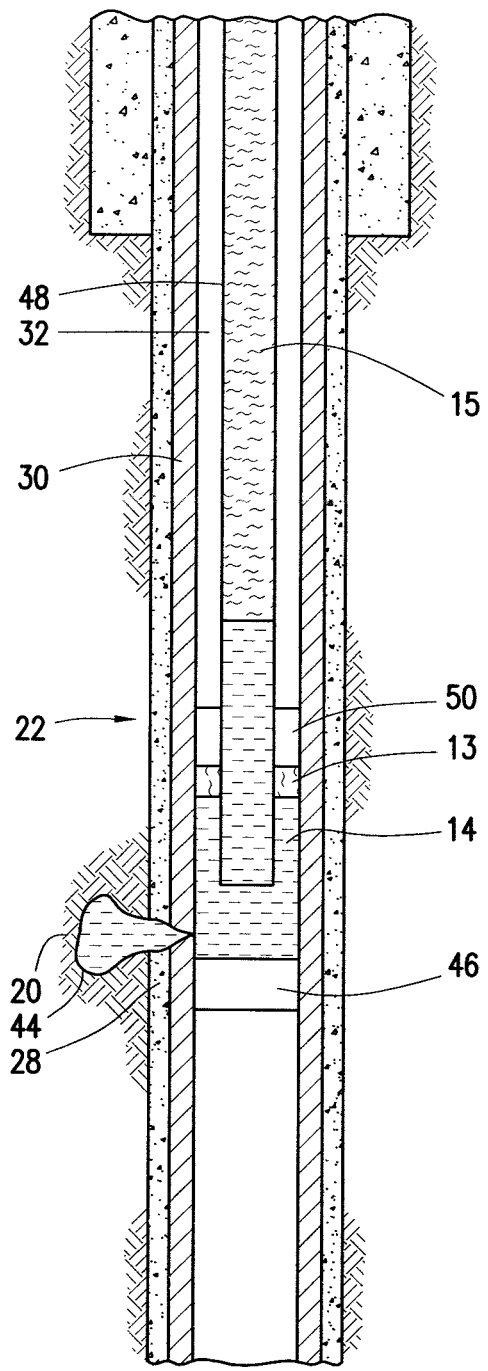
FIG. 6 is a schematic illustration of another example in which a resin composition and/or a resin-cement composite is used in a remedial cementing application.

FIGS. 4-6 illustrate methods of remedial or secondary cementing. Turning now to FIG. 4, there is shown a partial cross-section of a conventional producing wellbore 22 that has a primary cemented casing 30. The cement sheath 28 around the casing 30 may have defects potentially caused by a variety of issues, such as improper curing of the cement sheath 28 while it was being formed. Alternatively, the primary cementing may have been successful, but due to adverse temperatures and pressures within the subterranean formation 20, the casing 30 and/or the cement sheath 28 surrounding the casing 30 may form cracks or other types of small perforations 44. The small perforations 44 may be problematic since they may facilitate the introduction of undesirable fluids into the casing 30. As shown in FIG. 4, a small perforation 44 has formed in the cement sheath 28 and the casing 30, potentially allowing the introduction of undesirable fluids into the interior of the casing 30.

Referring now to FIG. 5, a small perforation 44 may be filled or plugged by a resin composition 14 or a resin-cement composite. A plug 46 (the plug 46 may be any type of plug, e.g., bridge plug, etc.) may be initially placed adjacent and below the small perforation 44, to form a barrier to prevent resin composition 14 from flowing down the wellbore 22 and therefore allow resin composition 14 of the present disclosure to fill the small perforations 44 in the casing 30 and cement sheath 28. As shown in FIG. 5, tubing 48 (e.g., coiled tubing, drill pipe, etc.) may be lowered into wellbore 22. A first spacer fluid 13 may be pumped into the wellbore 22 via the tubing 48 and allowed to flow down the interior of the tubing 48 and into the blocked section of the wellbore 22 created by the plug 46. A portion of the first spacer fluid 13 may then flow through the small perforation 44 while another portion may reside in the annulus 32. After pumping the first spacer fluid 13 through the tubing 48, the resin composition 14 may be pumped through the tubing 48. The resin composition 14 may be pumped down the interior of the tubing 48 and into the blocked section of the wellbore 22 created by the plug 46. A portion of the resin composition 14 may then flow through the small perforation 44 while another portion may reside in the annulus 32. The resin composition 14 may be allowed to set in the small perforation 44 and in a portion of the wellbore annulus 32, for example, to form a hardened resin (or alternatively a hardened resin-cement composite) that seals small perforation 44 to prevent the migration of undesirable fluids into the interior of the casing 30. After the resin composition 14 has been pumped into the tubing 48, a second spacer fluid 15 may be pumped into the tubing 48 and allowed to flow down the interior of the tubing 48 into the blocked section of the wellbore 22 created by the plug 46 and up around the tubing 48 into the wellbore annulus 32. Alternatively, one or no spacer fluids may be used, and resin composition 14 may not need to be separated from other fluids introduced previously or subsequently into wellbore 22. The tubing 48 may then be removed. The plug 46 may also be removed. In alternative embodiments, plug 46 may remain in the wellbore 22 and be drilled through. After tubing 48 is removed, the portion of the hardened resin composition 14 remaining in the wellbore 22 (i.e., the portion not in the small perforation 44) may then be drilled through.

FIG. 6 describes another embodiment of filling a small perforation 44 with a resin composition 14. A plug 46 (the plug 46 may be any type of plug, e.g., bridge plug, etc.) may be initially placed adjacent and below the small perforation 44, to form a barrier that may allow pressurized pumping of a resin composition 14 of the present disclosure to fill any small perforations 44 in the casing 30 and cement sheath 28. As shown in FIG. 6, tubing 48 (e.g., coiled tubing, drill pipe, etc.) may be lowered into wellbore 22. Tubing 48 may be attached to a retainer 50 or may be inserted into a retainer 50 already placed into the wellbore 22. Retainer 50 may allow for the pressurized pumping of the resin composition 14 into any small perforations 44. Retainer 50 must be placed adjacent to and above the small perforations 44 to be filled by resin composition 14. Retainer 50 may be any type of retainer, for example, a cement retainer. After plug 46, tubing 48, and retainer 50 are placed, a first spacer fluid 13 may be pumped into the wellbore 22 via the tubing 48 and allowed to flow down the interior of the tubing 48 and into the blocked section of the wellbore 22 created by the plug 46. A portion of the first spacer fluid 13 may then flow through the small perforation 44. After pumping the first spacer fluid 13 through the tubing 48, the resin composition 14 may be pumped through the tubing 48. The resin composition 14 may be pumped down the interior of the tubing 48 and into the blocked section of the wellbore 22 created by the plug 46. A portion of the resin composition 14 may then flow through the small perforation 44 while another portion may reside in the space formed between the plug 46 and retainer 50. The resin composition 14 may be allowed to set in the small perforation 44 and in the space formed between the plug 46 and retainer 50. The resin composition 14 may then harden to form a hardened resin (or alternatively a hardened resin-cement composite) that seals small perforation 44 to prevent the migration of undesirable fluids into the interior of the casing 30. After the resin composition 14 has been pumped into the tubing 48, a second spacer fluid 15 may be pumped into the tubing 48 and allowed to flow down the interior of the tubing 48 into the blocked section of the wellbore 22 created by the plug 46 and into the space formed between the plug 46 and retainer 50. Alternatively, one or no spacer fluids may be used, and resin composition 14 may not need to be separated from other fluids introduced previously or subsequently into wellbore 22. The tubing 48 may then be removed. The plug 46 may also be removed. In alternative embodiments, plug 46 may remain in the wellbore 22 and be drilled through. Retainer 50 may also be removed. Conversely, in alternative embodiments, retainer 50 may be drilled through. After tubing 48 is removed, the portion of the hardened resin composition 14 remaining in the wellbore 22 (i.e., the portion not in the small perforation 44) may then be drilled through.

The exemplary resin compositions and resin-cement composites disclosed herein may directly or indirectly affect one or more components or pieces of equipment associated with the preparation, delivery, recapture, recycling, reuse, and/or disposal of the resin compositions and resin-cement composites. For example, the resin compositions and resin-cement composites may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary resin compositions and resin-cement composites containing the same. The disclosed resin compositions and resin-cement composites may also directly or indirectly affect any transport or delivery equipment used to convey the resin compositions and resin-cement composites to a well site or downhole such as, for example, any transport vessels, conduits, pipelines, trucks, tubulars, and/or pipes used to compositionally move the resin compositions and resin-cement composites from one location to another, any pumps, compressors, or motors (e.g., topside or downhole) used to drive the resin compositions and resin-cement composites, or fluids containing the same, into motion, any valves or related joints used to regulate the pressure or flow rate of the resin compositions and resin-cement composites (or fluids containing the same), and any sensors (i.e., pressure and temperature), gauges, and/or combinations thereof, and the like. The disclosed resin compositions and resin-cement composites may also directly or indirectly affect the various downhole equipment and tools that may come into contact with the resin compositions and resin-cement composites such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

EXAMPLES

To facilitate a better understanding of the present embodiments, the following examples of some of the preferred embodiments are given. In no way should such examples be read to limit, or to define, the scope of the disclosure.

Example 1

A 1,1-bis(2-glycidyloxy-1-naphthyl)methane resin additive was synthesized by stirring 12.0 g/0.04 mol of 1,1-bis (2-naphthol)methane into 32.0 mL/0.41 mol of epichlorohydrin. The phase transfer catalyst, tetrabutylammonium bromide was added (1.42 g/0.004 mol) to aid the dissolution of the 1,1-bis(2-naphthol)methane in the epichlorohydrin. The resulting light brown suspension was stirred at room temperature. 3.20 g/0.08 mol of powdered sodium hydroxide was then added at a slow rate to the mixture to control the exotherm and maintain the reaction temperature below 27° C. The 1,1-bis(2-naphthol)methane dissolved to create a dark brown solution. Stirring was continued for 2 hours and then additional powdered sodium hydroxide (5.59 g/0.14 mol) was added in increments over the next 3 hours. The reaction was then allowed to stir overnight at room temperature. The following day, the reaction was stirred with 100 mL of water and then the water was decanted. This was repeated twice to remove residual salts. Following this, the residue was stirred with 75 mL of ethanol for 1 hour. During this step, a light colored solid coalesced. The solid was collected by vacuum filtration and then washed with ethanol two additional times. The solids were then dried in an oven at 65° C. overnight to produce a tan powder. NMR was performed to confirm the product. The yield was 11.1 g (67.4%). The $^1$H NMR was performed on a 500 MHz instrument using $CDCl_3$ as a solvent. The observed spectra was $^1$H NMR ($CDCl_3$) δ 8.22 (2H, m, ArH), 7.71 (4H, m, ArH), 7.35 (2H, t, ArH), 7.25 (2H, m, ArH), 7.21 (2H, d, ArH), 4.95 (2H, m, $CH_2$), 4.03 (4H, m, $CH_2$), 2.99 (2H, m, CH), 2.71 (2H, m, $CH_2$), 2.57 (2H, m, $CH_2$).

Example 2

The napthol-based epoxy resin additive prepared in Example 1 was added to 4 samples of a bisphenol-F diglycidyl ether resin and a diethyltoluenediamine hardening agent. An additional control sample was also prepared that did not use any napthol-based epoxy resin additive. All samples were prepared at room temperature. The liquid resin formulations were cured and tested in a differential scanning calorimeter. The samples were heated from 50° C. to 250° C. at a rate of 2.5° C. per minute. The samples were then held at 250° C. for five minutes to ensure a full cure of the resin. The full cure was observed by the cessation of the exotherm as read by the differential scanning calorimeter. The sample was then cooled to 50° C. at 10° C. per minute. Finally, the glass transition was measured by heating the sample from 50° C. to 250° C. at 10° C. per minute. The compositional makeup of the samples and the results of the DSC analysis are presented in Table 1 below.

TABLE 1

Sample Formulations and DSC Results

| Sample | Resin (g) | Hardening Agent (g) | Resin Additive (g) | Resin Additive (%) | $T_g$ (° F.) |
|---|---|---|---|---|---|
| 1 | 15.00 | 4.28 | 0.00 | 0 | 263 |
| 2 | 14.25 | 4.23 | 0.75 | 5 | 278 |
| 3 | 13.50 | 4.18 | 1.5 | 10 | 284 |
| 4 | 12.00 | 3.00 | 4.07 | 20 | 286 |
| 5 | 9.00 | 6.00 | 3.87 | 40 | 288 |

The results indicate that there is only one inflection point corresponding to the glass transition temperature of the blended resin. This indicates that the napthol-based epoxy resin additive has dissolved and become fully incorporated into the resin matrix. Furthermore, the results show that adding even 5% by weight of napthol-based epoxy resin additive increases the glass transition temperature of the resin system.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present invention. If there is any conflict in the usages of a word or term in this specification and one or more patent(s) or other documents that may be incorporated herein by reference, the definitions that are consistent with this specification should be adopted.

What is claimed is:

1. A method of well cementing comprising:
introducing a resin composition into a wellbore, wherein the resin composition comprises a first resin selected from the group consisting of epoxy-based resin, novolac resin, polyepoxide resin, phenol-aldehyde resin, urea-aldehyde resin, urethane resin, phenolic resin, furan/furfuryl alcohol resin, phenol formaldehyde resin, bisphenol A diglycidyl ether resin, butoxymethyl butyl glycidyl ether resin, bisphenol A-epichlorohydrin resin, bisphenol F resin, glycidyl ether resin, polyester resin, polyurethane resin, acrylate resin, and any combination thereof, a naphthol-based epoxy resin additive, and a hardening agent, wherein the naphthol-based epoxy resin additive comprises two naphthalene functional groups and two epoxide functional groups, wherein the first resin is present in an amount of about 5% to about 99% by volume of the resin composition.

2. The method of claim 1 wherein the naphthol-based epoxy resin additive comprises a resin additive selected from the group consisting of 1,1-bis(2-glycidyloxy-1-naphthyl)alkane, 1-(2,7-diglycidyloxy-1-naphthyl)-1-(2-glycidyloxy-1-naphthyl)alkane, 1,1-bis(2,7-diglycidyloxy-1-naphthyl)alkane, and any combination thereof.

3. The method of claim 1 wherein the naphthol-based epoxy resin additive comprises 1,1-bis(2-glycidyloxy-1-naphthyl)methane.

4. The method of claim 1 wherein the naphthol-based epoxy resin additive is present in an amount of about 1% to about 10%.

5. The method of claim 1 wherein the hardening agent is selected from the group consisting of an aliphatic amine, an aliphatic tertiary amine, an aromatic amine, a cycloaliphatic amine, a heterocyclic amine, an amido amine, a polyamide, a polyethyl amine, a polyether amine, a polyoxyalkylene amine, a carboxylic anhydride, triethylenetetramine, ethylene diamine, N-cocoalkyltrimethylene, isophorone diamine, N-aminophenyl piperazine, imidazoline, 1,2-diaminocyclohexane, polytheramine, diethyltoluenediamine, 4,4'-diaminodiphenyl methane, methyltetrahydrophthalic anhydride, hexahydrophthalic anhydride, maleic anhydride, polyazelaic polyanhydride, phthalic anhydride, and any combination thereof.

6. The method of claim 1 wherein the resin composition comprises a diluent.

7. The method of claim 6 wherein the diluent is selected from the group consisting of butyl glycidyl ether, cyclohexane dimethanol diglycidyl ether, polyethylene glycol, butyl lactate, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, d'limonene, fatty acid methyl esters, and any combinations thereof.

8. The method of claim 1 wherein at least a portion of the resin composition is allowed to enter into and harden in a perforation in a casing within a wellbore.

9. The method of claim 1 wherein at least a portion of the resin composition is allowed to enter into and harden in a perforation in a cement sheath within a wellbore.

10. The method of claim 1 further comprising introducing the resin composition into an annular space formed between a pipe string and walls of the wellbore or a larger conduit.

11. The method of claim 1 further comprising blending the resin composition and a cement composition, wherein the cement composition comprises water and hydraulic cement.

* * * * *